UNITED STATES PATENT OFFICE.

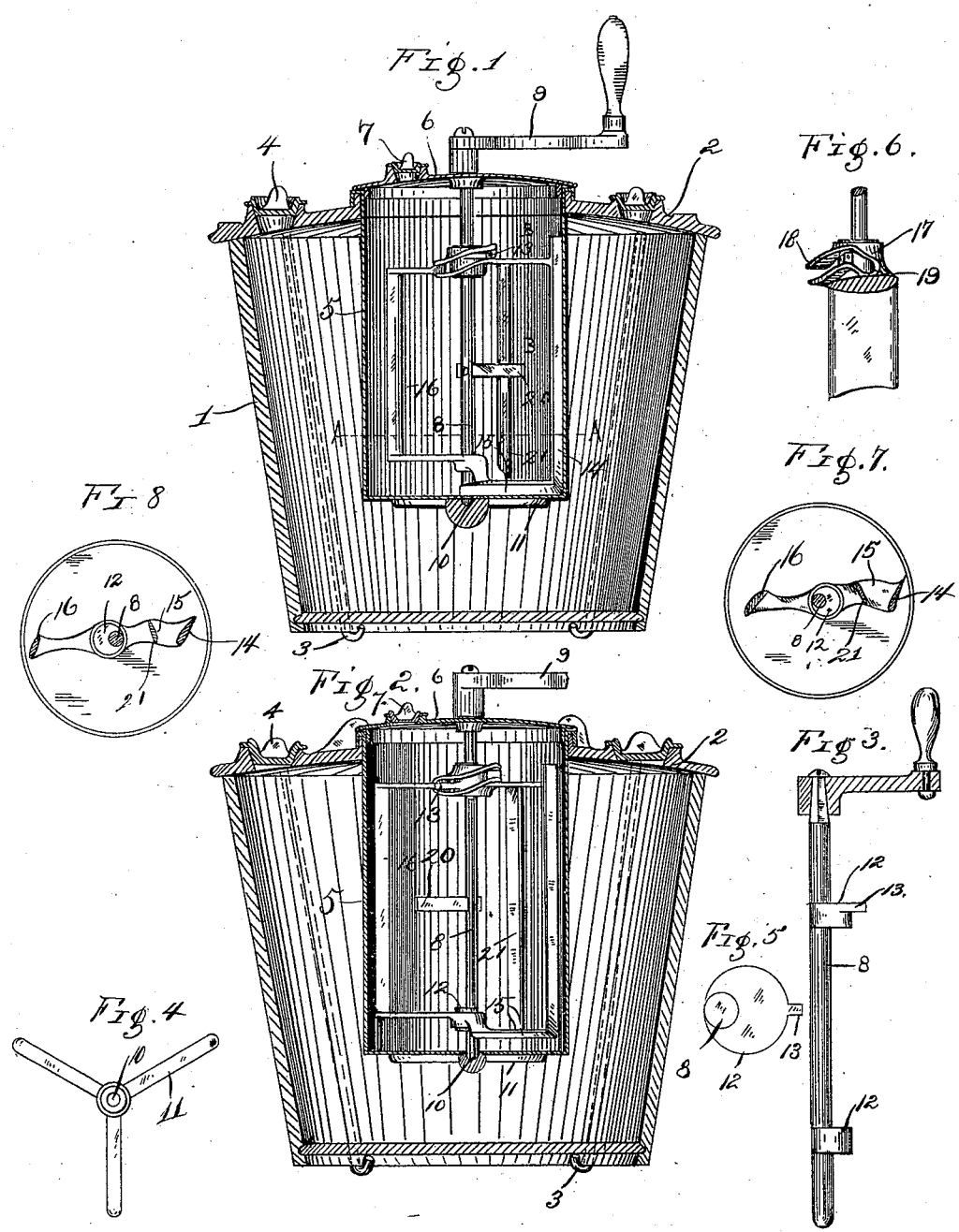

GEORGE G. F. BOSWELL, OF INDIANAPOLIS, INDIANA.

ICE-CREAM FREEZER.

SPECIFICATION forming part of Letters Patent No. 552,409, dated December 31, 1895.

Application filed July 3, 1895. Serial No. 554,893. (No model.)

*To all whom it may concern:*

Be it known that I, GEORGE G. F. BOSWELL, of Indianapolis, county of Marion, and State of Indiana, have invented a certain new and useful Ice-Cream Freezer; and I do hereby declare that the following is a full, clear, and exact description thereof, reference being had to the accompanying drawings, in which like figures refer to like parts.

My invention relates to an ice-cream freezer, and its object is, in addition to cheapness and simplicity in construction, the arrangement of a scraping mechanism within the cream-can that can be moved into and out of engagement with the side and bottom of the can by rotating the shaft on which it is carried in one direction or another. When the scraper is not in engagement with the side and bottom, it serves as a beater, mixer or worker. The full nature of my invention will be understood from the accompanying drawings and the description following.

Figure 1 shows a vertical central section of my freezer with the scraper in engagement with the side of the cream-can. Fig. 2 shows the same section with the scraper out of engagement with the side and bottom of the cream-can. Fig. 3 is an elevation of the shaft on which the scraper is mounted. Fig. 4 is a reinforcement of the bottom of the cream-can and in which the lower end of the shaft has its bearing. Fig. 5 is the plan view of the upper end of the shaft. Fig. 6 is a detail view of the mounting of the scraper on the upper bearing on the shaft. Fig. 7 is a plan view of the cream-can with the lid off, showing the scraper in section in engagement with the cream-can. Fig. 8 is the same with the scraper out of engagement with the cream-can.

My ice-cream freezer consists of an attachment preferably to an ordinary wooden pail or bucket 1. On the top of the bucket is the lid or covering 2, held in place on the bucket by some long iron rods 3, that hook at the lower ends with a catch under the edge of the bucket. The upper ends of these rods are connected by a nut with the lid or top 2, and when the nuts are screwed down tight the union between the top 2 and the bucket 1 is water-tight. In the lid I provide at 4 suitable openings for introducing ice, salt or other refrigerating material into the pail 1. Centrally suspended from or supported by the top or lid 2 is the cream-can 5. It is, as here shown, fixed to the top or lid 2, so that it is not rotatable. This cream-can is, of course, provided with a suitable lid 6, having at 7 an opening for the insertion of cream or other material and also for inspecting the contents. Extending centrally through the lid 6 is a shaft 8, having on its upper end the handle 9 and resting at its lower end in the bearing 10 formed by the reinforcement 11 secured to the bottom of the cream-can.

The shaft 8 is provided above and below with eccentric-bearings 12, the upper one having an extension, lug or pin 13. Upon these eccentric-bearings I mount the scraping and working mechanism. This consists of a scraper 14 for scraping the side and bottom of the cream-can connected by the arms 15 with the worker 16. The arms 15 are centrally provided with a bearing place mounted on the eccentric-bearings 12. The upper one of these bearing places, which is marked 17, is provided with an inclined or spirally-directed slot 18 in which the lug or pin 13 extends.

From this description it is apparent that when the handle is turned in one direction the eccentric-bearings 12 will cause the scraper to engage and scrape the side of the can, and when it is turned in another direction it will cause the said scraper to disengage the side of the can and act as a worker. By reason of the inclined or spirally directed slot 18 such movement of the handle or rotation of the shaft will at the same time elevate the scraper out of engagement with the bottom of the cream-can or move it back into engagement. While freezing cream, therefore, the operator can at frequent intervals scrape the cream off the side and the bottom of the cream-can as it is frozen and work the scraper, as he desires, by merely reversing the movement of the handle or crank 9. The construction here shown can be made strong and the power is directly transmitted, so that the frozen material can usually be removed with ease; but when the scraping part of the process has been neglected so long that a thick layer of frozen cream is spread over the surface of the can and its immediate removal would subject the mechanism to too much strain or be hard to effect, I overcome the difficulty by extending the inclined slot 18 beyond its highest point downward somewhat as shown at 19 in Fig. 6 and securing to the shaft the flat spring 20, which, when the scraper is brought into engagement with the side of the can, comes normally in contact with the intermediate bar 21.

Supposing the operator should neglect scraping the ice from the side of the can until a thick layer has been formed, upon the sudden reversal of the crank or handle, when the power exerted is usually above the average, the eccentric-bearing will force the scraper suddenly out to the side of the can. If the layer is thick enough to form sufficient resistance to the scraper after it has reached the side of the can, the power exerted by the sudden reversal of the crank will carry the eccentric-bearing beyond its outer point and will also force the pin 13 over the highest point in the inclined slot 18 into the downwardly-extending portion 19 thereof. Then it is obvious that the scraper will be withdrawn from the side of the can and from the great resistance of the thick layer. Then the spring 20, through its bearing on the intermediate bar 21, will tend to force the scraper back into its normal outer position, and this causes it to gradually remove the thick layer of cream. Of course this gradual removal of the thick layer of cream can also be effected, if the operator thinks about it, by slowly and gradually reversing the crank and exerting his own power gradually in driving the scraper, just as the spring does when the scraper is past the point of the eccentric.

What I claim as my invention, and desire to secure by Letters Patent, is—

1. In an ice cream freezer, a shaft centrally mounted in the cream can having eccentric bearings on it, and a scraper mounted on such bearings, whereby the scraper will be moved into or out of engagement with the cream can as the shaft is rotated one way or the other, substantially as shown and described.

2. In an ice cream freezer, a shaft centrally mounted in the cream can having a bearing on it provided with a pin or lug, and a scraper for scraping the bottom of the can that is mounted on such bearing and has a spirally directed slot or groove in which such pin or lug extends, whereby when the shaft is rotated one way or the other the scraper will be moved into or out of engagement with the bottom of the cream can, substantially as shown and described.

3. In an ice cream freezer, a shaft centrally mounted in the cream can and having eccentric bearings on it with a pin or lug on at least one bearing, and a scraper mounted on such bearings and having a spirally directed slot or groove in which such pin or lug extends, whereby the scraper will be moved into or out of engagement with the side and bottom of the cream can when the shaft is rotated in one way or the other, substantially as shown and described.

4. In an ice cream freezer, a shaft centrally mounted in the cream can and having eccentric bearings on it with a pin or lug on at least one bearing, a scraper mounted on such bearings and having a slot or groove inclined upward for some distance and then downward in which the pin or lug extends, and a spring so mounted that it will permit the lug or pin to pass beyond the most elevated portion of such groove or slot but will tend to resist such movement, substantially as shown and described.

In witness whereof I have hereunto set my hand this 28th day of June, 1895.

GEORGE G. F. BOSWELL.

Witnesses:
V. H. LOCKWOOD,
WORTH WRIGHT.